United States Patent
Courvoisier et al.

(10) Patent No.: US 8,717,853 B2
(45) Date of Patent: May 6, 2014

(54) MULTI-SECTOR DISPLAY

(75) Inventors: Raphael Courvoisier, Montmollin (CH); Roman Egli, Oensingen (CH); Paulo Bravo, Hauterive (CH)

(73) Assignee: ETA SA Manufacture Horlogère Suisse, Grenchen (CH)

( * ) Notice: Subject to any disclaimer, the term of this patent is extended or adjusted under 35 U.S.C. 154(b) by 425 days.

(21) Appl. No.: 13/235,442

(22) Filed: Sep. 18, 2011

(65) Prior Publication Data

US 2012/0067271 A1    Mar. 22, 2012

(30) Foreign Application Priority Data

Sep. 21, 2010 (EP) .................................... 10177822

(51) Int. Cl.
| | | |
|---|---|---|
| *G04B 19/04* | (2006.01) | |
| *G01D 13/22* | (2006.01) | |
| *G04B 19/00* | (2006.01) | |
| *G04B 19/06* | (2006.01) | |
| *G04B 19/08* | (2006.01) | |

(52) U.S. Cl.
CPC ............... G04B 19/00 (2013.01); G04B 19/06 (2013.01); G04B 19/082 (2013.01); G01D 13/22 (2013.01)
USPC .............. 368/80; 368/223; 368/228; 116/300

(58) Field of Classification Search
CPC ...... G04B 19/08; G04B 19/082; G04B 19/06; G01D 7/00; G01D 13/02; G01D 13/04; G01D 13/22
USPC ............. 368/80, 223, 228; 116/300, 328, 329
See application file for complete search history.

(56) References Cited

U.S. PATENT DOCUMENTS

| | | | | |
|---|---|---|---|---|
| 4,355,380 A | * | 10/1982 | Huguenin et al. | 368/71 |
| 5,043,955 A | * | 8/1991 | Dubois et al. | 368/228 |
| 5,257,246 A | | 10/1993 | Ehsman | |
| 6,883,961 B1 | | 4/2005 | Ray | |
| 7,940,604 B2 | * | 5/2011 | Inoue et al. | 368/80 |
| 2004/0264304 A1 | * | 12/2004 | Furukawa et al. | 368/223 |
| 2008/0013409 A1 | * | 1/2008 | Bland et al. | 368/223 |
| 2008/0062818 A1 | * | 3/2008 | Plancon et al. | 368/10 |

FOREIGN PATENT DOCUMENTS

FR      2 793 898 A1    11/2000

OTHER PUBLICATIONS

European Search Report issued Mar. 9, 2011, in European Application No. 10177822, filed Sep. 21, 2010.

* cited by examiner

*Primary Examiner* — Vit W Miska
(74) *Attorney, Agent, or Firm* — Oblon, Spivak, McClelland, Maier & Neustadt, L.L.P.

(57) ABSTRACT

Multi-sector mechanism (1) for displaying a physical quantity on a timepiece (100), on several partial displays (2), each representing the change in said physical quantity over a given partial range (3), the total range of variation in said quantity being covered by the set of said partial ranges (3), each partial display (2) including an indicator (4) that moves relative to a scale (5) representing the partial range (3) specific thereto. Each partial display (2) includes a continuous mechanism (11) for moving the moving indicator (4) thereof opposite a scale representing said total range, and includes eclipsing means arranged for only allowing said moving indicator (4) to be seen opposite said scale (5) representing the partial range (3) specific thereto, and for reducing or obscuring visibility of said moving indicator (4) opposite the scales representing any other partial ranges, and said continuous mechanisms (11) of said partial displays (2) are all synchronous with each other.

8 Claims, 2 Drawing Sheets

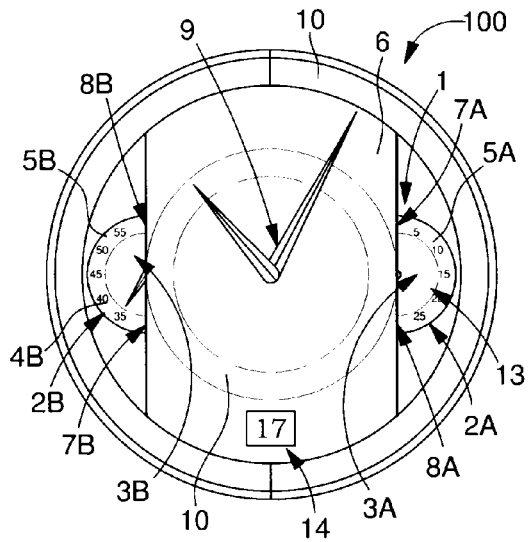
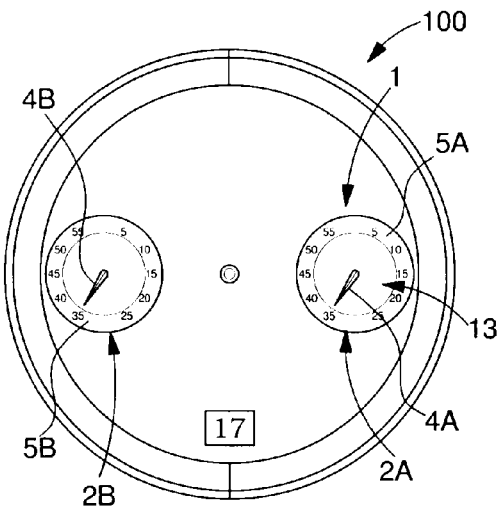
Fig. 1 Fig. 2
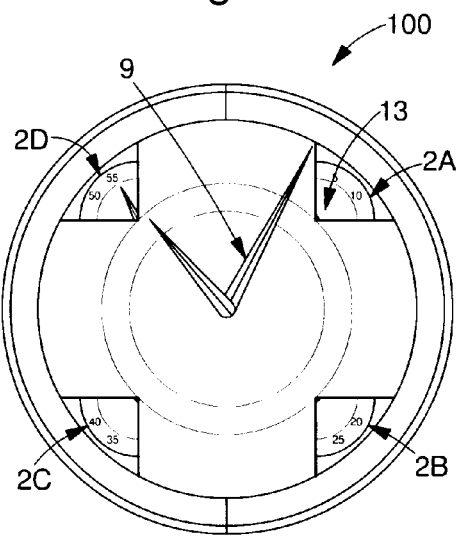
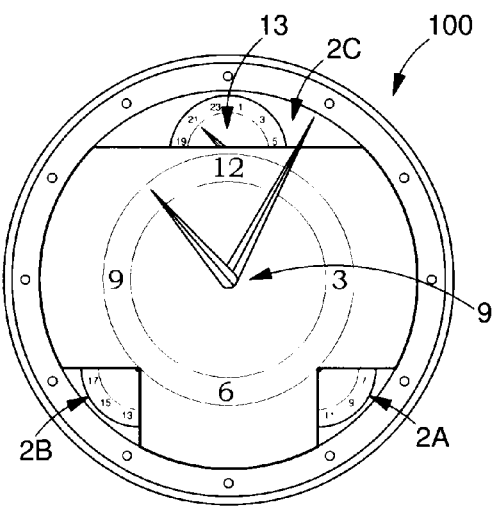
Fig. 3 Fig. 4
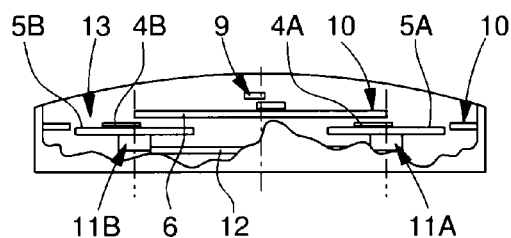
Fig. 5

MULTI-SECTOR DISPLAY

This application claims priority from European Patent Application No. 10177822.3 filed Sep. 21, 2010, the entire disclosure of which is incorporated herein by reference.

The invention concerns a multi-sector display mechanism for separating the display of a physical quantity on a scientific instrument or a timepiece, wherein the total range of variation in said physical quantity is covered by a set of partial ranges, on a plurality of distinct partial displays. Each partial display is arranged to represent the change in said physical quantity over a given partial range specific thereto, above and below predetermined limit values, such that the total range of variation in said physical quantity is covered by all of said partial ranges. Each said partial display includes an indicator that moves in relation to a scale or graduation showing said partial range specific to said partial display concerned, and each said partial display includes a continuous mechanism covering said total range of variation in said physical quantity, and said continuous mechanisms of said partial displays are all synchronous with each other.

The invention also concerns a timepiece incorporating at least one mechanism of this type.

FIELD OF THE INVENTION

The invention concerns the field of scientific instruments, and more specifically the field of horology.

The technical problem that the invention proposes to overcome is the distribution, over a scientific instrument or timepiece, of the display of the same given physical quantity on a plurality of display units, each of said display units having to represent the change in said physical quantity over a given range above and below predetermined limit values.

Depending upon the main timepiece display type and the complications comprised therein, it may be necessary, or simply advantageous, to free one or more particular areas of the timepiece dial for this main display and/or some of the complications, and particularly the central part of the dial.

It is then useful to be able to move the display of some quantitys into less crowded areas.

BACKGROUND OF THE INVENTION

It is known to use retrograde displays, which use substantially triangular sectors of the dial. However, the retrograde display is disconcerting for some users, who prefer a continuous display.

In FR Patent No. 647 409 in the name of Lancel, the time display is made to pass over a circular graduated sector via one of three cross-shaped wheel sets, pivoted by a Y-shaped support that always pivots in the same direction, all of which are concealed by a disc, with the exception of a single branch of a cross, shown in an annular space opposite the graduated circular sector.

Likewise, EP Patent No. 0 950 932 in the name of Daniel Roth and Gerald Genta discloses a wheel set that pivots continuously and carries two dual, opposite, pivoting hands, which are concealed except for an annular sector, opposite a graduated circular sector over an amplitude of 180°.

Continuous mechanisms with several arms are also known, which may be combined with an identical mechanism rotating in the opposite direction facing the same dial, as in CH Patent No. 699 117, in the name of Agenhor.

"Paul Picot Technograf" watches are also known, including two half-dials in a half-moon on either side of a central dial, each of which has a different function and includes an internal scale and an external scale, opposite which a respectively short or long end of the same dual hand is positioned.

The general principle of these known mechanisms is to combine a mask and one or more special hands so as to give the appearance of discontinuity.

FR Patent No. 2 793 898, in the name of TIMENTEL PTY discloses a watch with two juxtaposed cases, wherein the two movements are synchronised by electric conductors, each of the movements being provided with a retrograde display, such that the hands thereof, each operated by a motor, are either both stopped behind a mask, or moving on a respectively lower or upper half-dial.

In short, although mechanisms exist with particular arrangements of hands, or more generally display fingers, opposite a single graduated dial or concentric graduated dials, they have a retrograde display, the operation thereof is sometimes complex and their dimensions are ill-suited to the aforementioned constraints on use of the available space.

SUMMARY OF THE INVENTION

The invention proposes to provide a continuous display solution to the problem of distributing, over a timepiece, the display of the same physical quantity provided on a plurality of displays, each of these displays having to represent a given range of said physical quantity above and below predetermined limit values.

The physical quantity may be a time-related quantity but also another type of physical quantity, for example barometric, hygrometric, or other.

The invention therefore concerns a multi-sector display mechanism for separating the display of a physical quantity on a scientific instrument or a timepiece, wherein the total range of variation in said physical quantity is covered by a set of partial ranges, on a plurality of distinct partial displays. Each partial display is arranged to represent the change in said physical quantity over a given partial range dedicated thereto, above and below predetermined limit values, such that the total range of variation in said physical quantity is covered by all of said partial ranges. Each said partial display includes an indicator that moves in relation to a scale or a graduation showing said partial range specific to said partial display concerned, and each said partial display includes a continuous mechanism covering said total range of variation in said physical quantity. Said continuous mechanisms of said partial displays are all synchronous with each other. The invention is characterized in that each said partial display is arranged to move said moving indicator thereof opposite a scale representing said total range, and in that each said partial display includes eclipsing means arranged for allowing the moving indicator thereof to be seen only opposite said scale representing said partial range specific thereto, and for reducing or obscuring visibility of said moving indicator opposite the scales representing any other partial ranges.

According to a feature of the invention, said eclipsing means includes at least one mask arranged for allowing only said partial range specific thereto to be seen and for concealing any other partial ranges, and for concealing said moving indicator specific thereto when said indicator is in front of or opposite any other partial range.

According to a feature of the invention, each said continuous mechanism has a cyclical movement.

More specifically, according to another feature of the invention, each said continuous mechanism has a periodic movement.

According to a feature specific to a preferred embodiment, said physical quantity is a time quantity.

The invention also concerns a timepiece incorporating at least one mechanism of this type.

BRIEF DESCRIPTION OF THE DRAWINGS

Other features and advantages of the invention will appear upon reading the following description, with reference to the annexed drawings, in which:

FIG. 1 shows a schematic front view of a timepiece including a mechanism according to the invention, in a first embodiment, FIG. 2 shows the timepiece of FIG. 1, shown without the main hands thereof and after removal of a mask comprised in the mechanism according to the invention;

FIG. 3 shows a schematic front view of a timepiece including a mechanism according to the invention, in a second embodiment, FIG. 4 shows a schematic front view of a timepiece including a mechanism according to the invention, in a third embodiment, FIG. 5 shows a schematic partial plan view of the timepiece of FIG. 1.

DETAILED DESCRIPTION OF PREFERRED EMBODIMENTS

Figures 6, 7, 8:
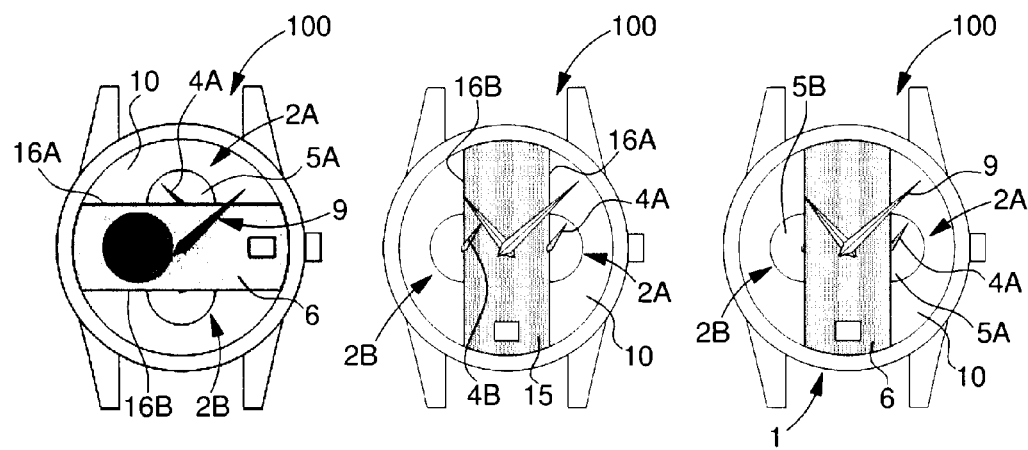
FIG. 6 shows a schematic front view of a timepiece including a mechanism according to the invention, in another variant.
FIG. 7 shows a schematic front view of a timepiece including a mechanism according to the invention, in another variant based on the visual aspect of the indicator and the dial.
FIG. 8 shows a schematic front view of a timepiece including a mechanism according to the invention, in the embodiment of FIG. 1 in a similar view to the piece in FIG. 7.

The invention concerns the field of scientific instruments, and more specifically the field of horology.

Separating the display of a physical quantity into several partial displays not only takes advantage of the volume available in a scientific instrument or in a timepiece, but also offers the user information relating to a particular field, and can provide a different visual display, as regards the display scale, or the colour of an indicator, for one or several particular ranges.

For example, a radioactivity counter may display, in a first low range and in a first aperture of small size, the measured radioactivity level up to a certain first threshold. Beyond this first threshold, the display is provided, for example with a different coloured hand and in a second aperture of larger size than the first, for a second range corresponding to an area requiring increased caution, up to a second threshold. Beyond this second threshold, a third dangerous area is evidenced by a third aperture of still larger size, and with a different coloured hand.

The invention will be more particularly described here for a preferred embodiment for a timepiece, but it is clear, in light of the preceding example, that the invention may be implemented for displaying any type of physical quantity, in conjunction with measuring and/or counting means and/or means for generating a physical quantity, on a device called a "scientific instrument" hereinafter.

The invention concerns a multi-sector display mechanism for separating the display of a physical quantity on a scientific instrument or timepiece 100, wherein the total range of the variation in said physical quantity is covered by a set of partial ranges 3 on a plurality of partial displays 2.

These partial displays 2 are distinct, and each arranged to represent the change in the physical quantity over a given partial range 3, specific thereto, above and below predetermined limit values, such that the total variation range of the physical quantity is covered by the set of partial ranges 3. Each said partial display 2 includes an indicator 4 that moves relative to a scale 5 or graduation, representing said partial range 3 specific to the partial display 2 concerned.

According to the invention, each said partial display 2 includes a continuous mechanism 11 covering the entire range of variation in said physical quantity, which is arranged to move the moving indicator 4 thereof over the total range. The continuous mechanisms 11 of partial displays 2 are all synchronised with each other.

Moreover, according to the invention, each partial display 2 is arranged to move the moving indicator 4 thereof opposite a scale representing said total range. Each said partial display 2 includes eclipsing means arranged for allowing the moving indicator 4 thereof only to be seen opposite the scale 5 representing the partial range 3 specific thereto, and further arranged for reduce or obscuring visibility of said moving indicator 4 thereof opposite the scales representing any other partial ranges.

In a particular embodiment, as seen in FIGS. 1, 3, 4, 5, 6 and 8, each partial display 2 includes a mask 6 arranged for revealing only the partial range 3 specific thereto, and for concealing any other partial ranges and for concealing the moving indicator 4 specific thereto when the latter is in front of or opposite any other partial range.

In a simplified embodiment, the eclipsing means lies in the shape and/or the decoration of moving indicators 4, typically hands, and/or in the decoration of a main dial 10.

FIG. 7 illustrates the case of hands 4A and 4B which include the same decoration as a decorated part 15 comprised in main dial 10, said decorated part being delimited by decoration borders 16A and 16B corresponding to partial displays 2A and 2B.

It is possible to make use simply of the colours as in the case of FIG. 7.

Figures 9, 10:
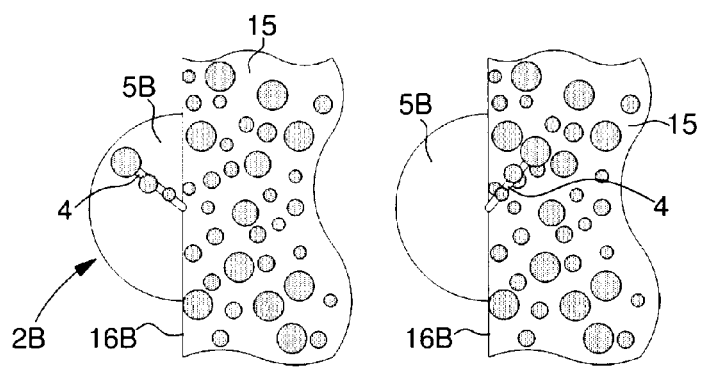
FIGS. 9 and 10 show schematic front views of a partial display according to the variant of FIG. 7, with a different type of decoration, FIG. 9 showing the display of the physical quantity in a partial range, and FIG. 10 showing the change in an area corresponding to a different partial range from the partial display concerned.
Figures 11, 12, 13:
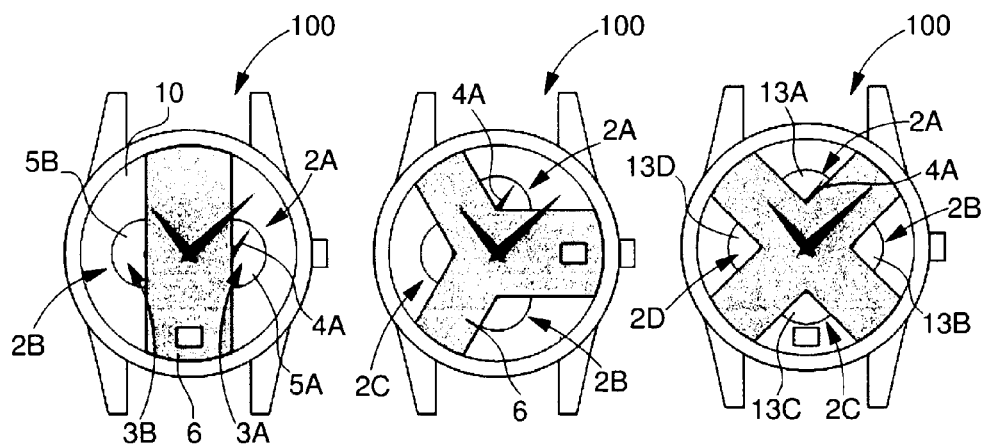
FIGS. 11 to 13 illustrate alternative arrangements of timepieces made with a multi-sector display according to the invention.

It is also possible to make use of the texture of the decoration, both of moving indicators 4 and a coloured background part 15, as seen in FIGS. 9 and 10, where the decoration is of random texture, which makes it very difficult to locate hand 4 relative to the decorated part 15 of the dial. This random texture provides a camouflage effect, and it is almost impossible to see hand 4 in front of decoration 15.

According to the invention, the continuous mechanisms 11 of these partial displays 2 of mechanism 1 are all synchronous with each other.

In a preferred embodiment, mechanism 1 is devised for a timepiece 100.

Preferably, each continuous mechanism 11 of each partial display 2 has a cyclical movement, and more particularly, a periodic movement.

In the preferred application described here, the physical quantity, to the display of which mechanism 1 is dedicated, is a time quantity.

Each continuous mechanism 11 is arranged to be coupled synchronously to a movement 12 comprised in the scientific instrument or timepiece 100.

As shown in the Figures, the invention separates the display of at least one physical quantity, the seconds in FIGS. 1 to 3, or the hours in FIG. 4, into a plurality of scales 5, particularly graduations, each located on a dial 13, which covers a partial field of the total possible amplitude of said physical quantity.

A moving indicator 4 is formed in the Figures by a hand. It may also take the form of a display finger, a disc with an aperture, or other indicator.

The complete display is visible by sector, and the user has the impression that the same hand jumps from one dial to the other.

The movements of continuous mechanisms 11 of partial dials 2 which drive said moving indicators 4 are all synchronous with each other, and said partial displays 2 form continuous displays.

Each of the partial displays includes a mask 6 including a first edge 7 corresponding to the predetermined lower limit of partial range 3 made visible by the partial display 2 concerned, and a second edge 8 corresponding to the predetermined upper limit of the same range.

In the example of the Figures, all of masks 6 are joined and form a single mask, but this is simply one particular embodiment.

In a particular version of the invention, not shown in the Figures, the amplitude of each mask 6 can be adjusted by the user, for example by a thumb-wheel located at the periphery of the bezel, and including locking/unlocking means. This configuration enables the user to format each of partial ranges 3 of the partial displays 2 of mechanism 1. In this version, a particular embodiment connects masks 6 to each other, for example by a gear, such that any action to adjust a first edge 7 or respectively a second edge 8, of a mask 6 of a given partial display 2 causes the adjustment of a second edge 8 or respectively a first edge 7, of another partial display 2, which corresponds to the preceding or respectively following range, in the scale of values of the physical quantity being displayed.

Different eclipsing means from masks may be used without thereby departing from the invention. The important factor is that these eclipsing means or masks 6 are arranged for concealing, at all times, all of said moving indicators 4, with the exception of a single indicator, which the user sees on the corresponding partial display 2. It is clear that, in the example of the Figures, only one hand of one of the partial displays is visible at any time. The other hand or hands, depending upon the number of partial displays 2, (which, in FIGS. 1 and 2 is 2, in FIG. 3 is 4 and in FIG. 4 is 3) are concealed.

Mask 6 can also be used to carry an aperture 14 for displaying another piece of information, for example the date.

FIGS. 1 to 3 illustrate a sector display of the seconds, which are displayed in areas of timepiece 100 where the user expects to see them. FIGS. 1 and 2 show the case of a display using half-discs. FIG. 2 shows that partial displays 2A and 2B are identical, absolutely synchronous, and each includes a hand 4A, 4B, in the same angular position. Mask 6 of FIG. 1 conceals hand 4A at the time shown. Only hand 4B of display 2B is visible. When mechanism 11B of partial display 2B drives hand 4B beyond the twelve o'clock position thereof, hand 4B will no longer be visible since it will pass underneath the second edge 8B and be concealed by mask 6. At that precise moment, hand 4A of partial display 2A will become visible to the right of the first edge 7A of partial display 2A, where it will remain visible until it disappears, in the six o'clock position thereof, underneath the second edge 8A. The other hand 4B of partial display 2B will then become visible after passing first edge 7B, as seen in FIG. 1.

FIG. 3 illustrates separation into four quadrants forming partial displays 2A, 2B, 2C, 2D. The operation is similar to that described for FIGS. 1 and 2.

It is clear that the invention allows differentiated displays to be made for ranges of unequal amplitude. For example, in the case of FIG. 4, which proposes a sector display of the time in 24 hours, differentiates a morning time display over an amplitude range of 6 hours on partial display 2A, the afternoon time display over a 6 hour range on partial display 2B, and the night-time over a 12 hour range on partial display 2C, with scales of different visual appearance. It is thus possible to propose a low cost timepiece model to the user, with a specific type of display, according to the user's profession or activities.

It can also be seen in the same example of FIG. 4, that the physical quantity with which we are concerned, which is the time here, may be shown in different ways, for example in 12 hours on a main hand 9 of timepiece 100, which moves relative to a main dial 10, and in 24 hours on mechanism 1 and the partial displays 2A, 2B, 2C thereof, which offers the user an AM/PM and day/night display, in addition to the usual display to which he is accustomed.

FIG. 5 illustrates an example mode of driving the moving indicators 4A and 4B via continuous mechanisms 11A and 11B, which may each be reduced to a simple pinion meshing with a wheel of the movement 12 of timepiece 100. This example is the least expensive, but other driving mechanisms using belts, chains or other elements may also be used, without departing from the invention.

A particular application concerns sports applications, with dials of different sizes for differentiating, for example, between the last moments before the start of a race, such as a regatta, which are of particular importance to the user, and the preceding moments which concern a prescribed waiting period. The invention may also be combined with a countdown. Mechanism 1 allows the pivoting direction of the moving indicators to be reversed easily, and the sector display may be partially or entirely achieved in the direction of the countdown.

In short, the invention provides a low cost multi-sector display. Separating the display of a physical quantity into several areas allows better use of the available space, by using a restricted space in each area to display very legibly information which would normally be confined to a very small display, if the display thereof were not fragmented.

A careful arrangement of a plurality of displays for different ranges of the same information may, also, enable the displays to be arranged in areas of the dial where the user expects to see them. For example, division into four quadrants, shifted to the four corners of a square or rectangular case, allows the user to be shown, in each of the corners, the time slot, for example, which he is used to seeing in the centre angle relative to the centre of the dial.

Information is distributed over several display units, but only one of the display units shows the information at any time, which also animates the timepiece dial by the periodic jump of the information display from one display unit to another.

With this arrangement the sequence of the display has its own rhythm which thus provides new information to the user, relative to the change from one field of the physical quantity concerned to another.

This animated display may provide mysterious effects, for example when the display is by a hand which seems to disappear from one of the display units, while an identical hand, which appears to be the same one, seems to appear on another display unit, corresponding to the next display range of the physical quantity concerned.

The invention has numerous advantages: a simple mechanism, reduced cost, compactness, easy to read information, and an innovative appearance.

What is claimed is:

1. A multi-sector display mechanism for separating the display of a physical quantity on a scientific instrument or a timepiece, wherein the total range of variation in said physical quantity is covered by a set of partial ranges, on a plurality of distinct partial displays, each arranged to represent the change in said physical quantity on a given partial display specific thereto, above and below predetermined limit values, such that the total range of variation in said physical quantity is covered by the set of said partial ranges, each said partial display including an indicator that moves in relation to a scale or graduation showing said partial range specific to said partial display concerned, and each said partial display including a continuous mechanism covering said total range of variation in said physical quantity, said continuous mechanisms of said partial displays all being synchronous with each other, wherein each said partial display is arranged to move said moving indicator thereof opposite a scale representing said total range, and wherein each said partial display includes eclipsing means arranged for allowing the moving indicator thereof to be seen only opposite said scale representing said partial range specific thereto, and for reducing or obscuring visibility of said moving indicator thereof opposite the scales representing any other partial ranges.

2. The mechanism according to claim 1, wherein said eclipsing means includes at least one mask arranged for allowing only said partial range specific thereto to be seen and for concealing any other partial ranges, and for concealing said moving indicator specific thereto when said indicator is in front of or opposite any other partial range.

3. The mechanism according to claim 1, wherein said scale is graduated.

4. The mechanism according to claim 1, wherein each said continuous mechanism has a cyclical movement.

5. The mechanism according to claim 1, wherein each said continuous mechanism has a periodic movement.

6. The mechanism according to claim 1, wherein said physical quantity is a time-related quantity.

7. The mechanism according to claim 1, wherein each said continuous mechanism is arranged to be coupled synchronously to a movement comprised in said scientific instrument or said timepiece.

8. The timepiece including at least one mechanism according to claim 1, wherein it includes a movement arranged to drive all of said continuous mechanism of said partial displays in a synchronous manner.

* * * * *